United States Patent
Schep

(10) Patent No.: US 7,113,467 B2
(45) Date of Patent: Sep. 26, 2006

(54) RECORD CARRIER WITH A SERVO TRACK HAVING WOBBLE WITH REDUCED CROSS-TALK AND AN APPARATUS FOR SCANNING THE RECORD CARRIER

(75) Inventor: Cornelis Marinus Schep, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 535 days.

(21) Appl. No.: 10/131,776

(22) Filed: Apr. 24, 2002

(65) Prior Publication Data

US 2003/0007440 A1 Jan. 9, 2003

(30) Foreign Application Priority Data

Apr. 24, 2001 (EP) .................... 01201485

(51) Int. Cl.
*G11B 7/24* (2006.01)
*G11B 7/0045* (2006.01)

(52) U.S. Cl. .............. 369/53.34; 369/275.3; 369/275.4; 369/59.25

(58) Field of Classification Search ........ 369/53.34, 369/275.3, 275.4, 59.25
See application file for complete search history.

(56) References Cited

U.S. PATENT DOCUMENTS

| | | | |
|---|---|---|---|
| 4,901,300 A | 2/1990 | Van Der Zande et al. | 369/47 |
| 5,187,699 A | 2/1993 | Raaymakers et al. | 369/48 |
| 5,930,228 A * | 7/1999 | Miyamoto et al. | 369/275.4 |
| 6,256,282 B1 * | 7/2001 | Yamagami et al. | 369/275.3 |
| 6,266,318 B1 * | 7/2001 | Honda et al. | 369/275.4 |

FOREIGN PATENT DOCUMENTS

WO WO 0043996 7/2000

\* cited by examiner

*Primary Examiner*—Brian E. Miller
*Assistant Examiner*—Peter Vincent Agustin

(57) ABSTRACT

A record carrier (1) has a servo track (4) indicating an information track (9) intended for recording information blocks represented by marks, this servo track (4) having a periodic variation of a physical parameter. Due to cross-talk, there exists a variation in the wobble signal called wobble beat. The track pitch t and the wobble period p, p being the length of a wobble period, are chosen in such a way that $2\pi t/p \approx n+\frac{1}{2}$ where n is integer. The choice results in a reduced wobble beat. A recording and/or playback device has apparatus for recording/reading the information blocks and for generating a wobble signal.

5 Claims, 4 Drawing Sheets

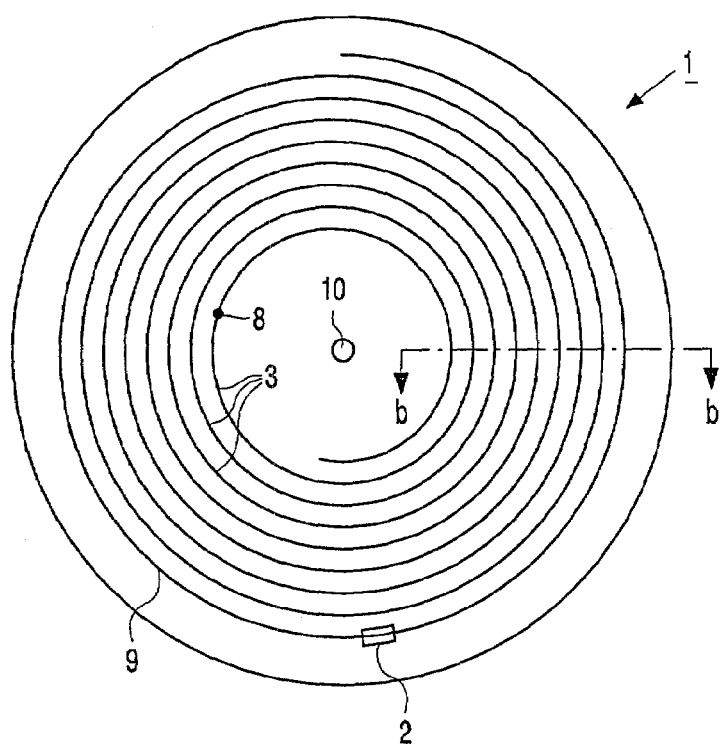
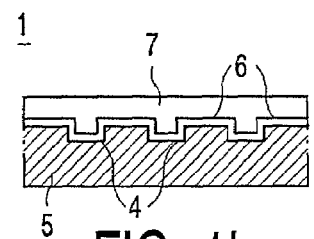
FIG. 1b
FIG. 1a
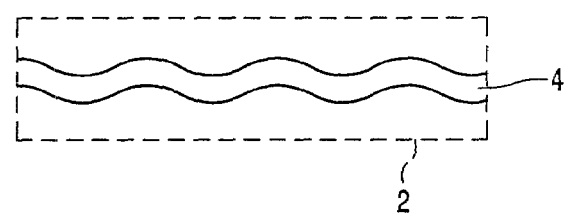
FIG. 1c
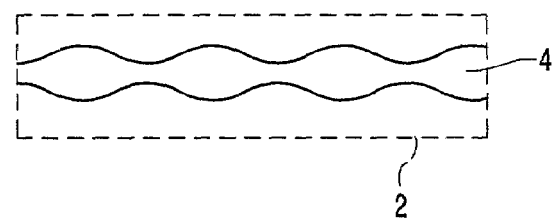
FIG. 1d

RECORD CARRIER WITH A SERVO TRACK HAVING WOBBLE WITH REDUCED CROSS-TALK AND AN APPARATUS FOR SCANNING THE RECORD CARRIER

BACKGROUND OF THE INVENTION

1. Field of the Invention

The invention relates to a record carrier comprising a servo track indicating an information track intended for recording information blocks represented by marks having lengths expressed in channel bits, this servo track having a wobble being a periodic variation of a physical parameter, and the servo track constituting a concentric or spiral pattern of substantially parallel tracks at a track pitch t.

The invention further relates to recording and/or playback device comprising means for writing and/or reading information blocks represented by marks having lengths expressed in channel bits in an information track on the record carrier, which device comprises means for scanning the servo track and retrieving the record carrier information.

The invention further relates to a method for manufacturing the record carrier.

2. Description of the Related Art

A record carrier and device of the type defined in the opening paragraph, for reading and/or writing information, are known from International Patent Application No. WO 00/43996, corresponding to U.S. Pat. Nos. 6,538,982 and 6,765,861. The information is encoded into an information signal which includes time codes and may be subdivided in accordance with these time codes into information blocks, the time codes being used as addresses, such as, with CD-ROM or DVD+RW. The record carrier has a servo track, usually called pre-groove, for causing servo signals to be generated when scanning the track. A physical parameter, e.g., the radial position, of the pre-groove periodically varies constituting a so-called wobble. During the scanning of the track, this wobble leads to a variation of the servo signals and a wobble signal can be generated.

A problem of the known system is that the wobble signal is disturbed by cross-talk. This problem become increasingly important in newer optical recording systems, such as, DVD and DVR, because the tracks are closer together in these higher density systems (even when scaling with the optical parameter is taken into account), and thus, the cross-talk between tracks increases.

SUMMARY OF THE INVENTION

It is an object of the invention, for example, to provide a record carrier and device in which the effect of cross-talk in the wobble signal is reduced.

According to the invention, a record carrier, as defined in the opening paragraph, is characterized in that the track pitch t and the length of a wobble period p are related so that $2\pi t/p \approx n+\frac{1}{2}$, where n is an integer. Further, the recording and/or playback device, as described in the opening paragraph, is characterized in that the device comprises means for generating a wobble signal from the record carrier as described above.

The invention is based on the following recognition. Many optical recording formats contain a wobble for write-clock generation. This wobble is usually predominantly monotonic to reduce write-clock jitter. In formats with high data density such as DVD and DVR, the tracks are close together. This implies that the spot on a central track not only sees the signal from the wobble on that central track, but also the signals of the wobbles on the adjacent tracks. In formats with constant linear density, such as DVD and DVR groove-only, the frequencies of the wobbles on the adjacent tracks as seen by the spot on a central track are slightly different from the frequency of the wobble on the central track due to the slightly different radius of the different tracks. This combination of cross-talk and frequency difference causes wobble beat, i.e., a slow variation in both the amplitude and the phase of the wobble. Details of the calculation of wobble beat are given in the description. Wobble beat can be a problem. On the one hand, the wobble signal should be sufficiently large for robust detection of the wobble. On the other hand, the wobble signal should be sufficiently small so as not to distort the high-frequency data. In the ideal situation, wobble beat would be absent. To reduce the amplitude of the wobble beat, the track pitch t and the wobble period p (i.e., the number of channel bits*the length of a channel bit) are chosen in such a way that $2\pi t/p \approx n+\frac{1}{2}$ where n is integer.

A further embodiment of the record carrier is characterized in that the relation of wobble period and track pitch is $0.30 < 2\pi t/p - n < 0.70$. It is not always possible to select the optimal value of ½ defined above. This because of restrictions resulting from the disc format (e.g., the total wobble length should comprise an integer number of wobbles, there should be an integer number of wobbles in a recording unit block, etc.). In particular, the value n=0 is a suitable choice, because then the wobble period is at its maximum.

A further embodiment of the record carrier is characterized in that the length of the wobble period p corresponds to a whole number m times the length of a channel bit. Such fixed relation has the advantage that the writing process can be easily locked to the detected wobble signal. An example of an appropriate relation is, e.g., a track pitch of 320 nm, a channel bit length of 80 nm and a wobble length of 69 times the channel bit length resulting in a value of $(2\cdot\pi\cdot320 \text{ nm})/(69\cdot80 \text{ nm})=0.364$.

BRIEF DESCRIPTION OF THE DRAWINGS

These and other aspects of the invention will be apparent from and elucidated further with reference to the embodiments described by way of example in the following description and with reference to the accompanying drawings, in which:

FIGS. 1a–1d show a record carrier provided with a servo-pattern;

DESCRIPTION OF THE PREFERRED EMBODIMENTS

Figure 2:
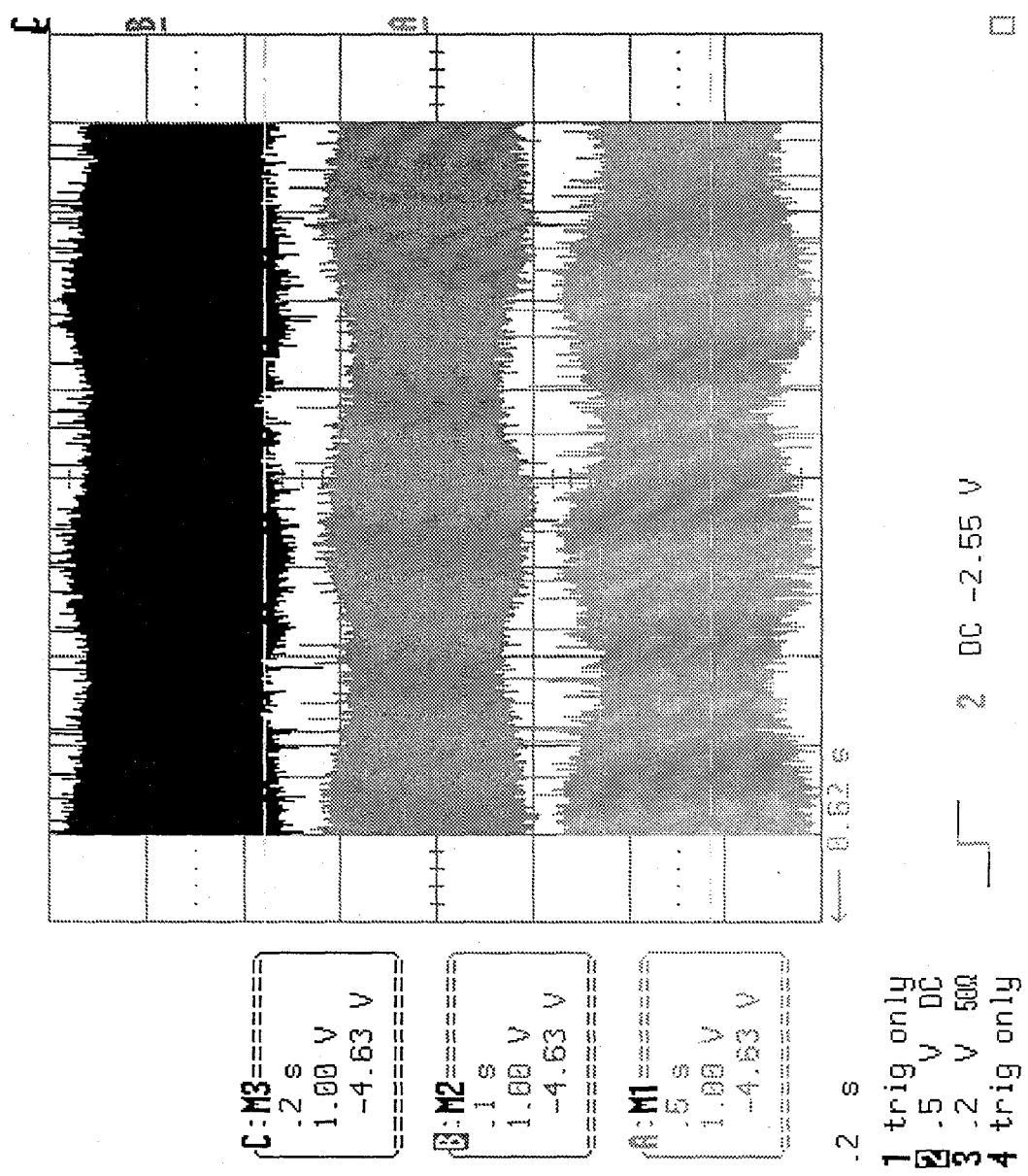
FIG. 2 shows the wobble beat.

In the Figures, elements which correspond to elements already described have the same reference numerals.

FIG. 1a shows a disc-shaped record carrier 1 provided with a track 9 intended for recording and a central hole 10. The track 9 is arranged in accordance with a spiral pattern of windings 3. FIG. 1b is a cross-section taken on the line b—b of the record carrier 1, in which a transparent substrate 5 is provided with a recording layer 6 and a protective layer 7. The recording layer 6 may be optically writable, for example, via phase change, or magneto-optically writable by a device for writing information, such as the known CD- Rewritable or CD-Recordable. The recording layer may also be provided with information via a production process, in which, first, a master disc is made, and then this master disc is subsequently replicated through pressing. The information is organized in information blocks and is represented by optically readable marks in the form of a succession of areas reflecting much radiation and little radiation such as, for example, a succession of pits of different lengths in a CD. In one embodiment, the track 9 on the record carrier of a rewritable type is indicated by a servo-pattern which is provided during manufacture of the blank record carrier. The servo-pattern is formed, for example, by a pre-groove 4 which enables a write head to follow the track 9 during scanning. The pre-groove 4 may be implemented as a deeper or a raised part, or as a material property deviating from its ambience. Alternatively, the servo-pattern may consist of an alternation of elevated and deeper windings, referred to as land and groove patterns, with a transition from land to groove or vice versa taking place per winding. FIGS. 1c and 1d show two examples of a periodical modulation (wobble) of the pre-groove. This wobble produces an extra signal in a tracking servo-sensor. The wobble is, for example, frequency-modulated, and position information, such as, an address, a time code or winding information, is coded in the modulation. A description of a rewritable CD system which is provided with position information in this way can be found in U.S. Pat. No. 4,901,300 (PHN 12.398) and U.S. Pat. No. 5,187,699 (PHQ 88.002). A servo-pattern may also consist of, for example, regularly distributed sub-patterns which periodically cause tracking signals. This description is based on information storage in a spiral track pattern which is filled from the inner winding to the outer winding, for example, as in a CD-ROM.

FIG. 2 shows wobble beat. It is clearly visible that the top trace, for which $2\pi t/p$ is closest to 0.5, shows the smallest wobble beat.

In the following, the calculation of wobble beat is outlined. Assuming the following simple model for cross-talk between wobbles of adjacent tracks:

$$I_{pp} = a_0 \cos(2\pi s_0/p) + a_1 \cos(2\pi s_1/p) + a_{-1} \cos(2\pi s_{-1}/p),$$

where Ipp is the push-pull signal, $a_i$ (i=−1, 0, 1) are the amplitudes of the wobble signals of the central (i=0) and the adjacent (i=−1, 1) tracks as measured by the spot on the central track, $s_i$ (i=−1, 0, 1) are the total lengths of the tracks i from the inner radius up to the position under consideration, and p is the period of the wobble.

Furthermore, it is assumed that the track is an ideal spiral. Then, the position along the track is fully characterized by either the length along the track s, the radius r, or the angle $\phi$. If the spiral has a track pitch t and starts at radius $r_b$, the following relation hold for an ideal spiral:

$$s = \pi(r^2 - r_b^2)/t,$$

$$\varphi = 2\pi(r - r_b)/t,$$

$$r = \frac{\varphi}{2\pi}t + r_b = \frac{\varphi + \varphi_b}{2\pi}t,$$

$$r_b = \frac{\varphi_b}{2\pi}t.$$

In practice, a spiral on a disc will never be ideal. It is, however, sufficient that the spiral is close to ideal locally, i.e., on the length scale of a few revolutions. The formulas of the ideal spiral can then be applied, with the restriction that the results should not depend on the precise values of $r_b$ and $\phi_b$. Results that depend on $r_b$ or $\phi_b$ would require the spiral to be ideal across the entire disc. Using the above formulas, the following results are obtained for the total lengths of the central and adjacent tracks:

$$s_0 = \pi(r_0^2 - r_b^2)/t,$$

$$s_1 = \pi((r_0+t)^2 - r_b^2)/t = s_0 + 2\pi r_0 + \pi t = s_0 + 2\pi(r_0+t/2) = s_0 + (\varphi_0+\varphi_b+\pi)t,$$

$$s_{-1} = \pi((r_0-t)^2 - r_b^2)/t = s_0 - 2\pi r_0 + \pi t = s_0 - 2\pi(r_0-t/2) = s_0 - (\varphi_0+\varphi_b-\pi)t.$$

By combining the above formulas, the following expression for the wobble beat signal are obtained:

$$\begin{aligned}
I_{PP} &= a_0 \cos(2\pi s_0/p) + a_1 \cos(2\pi s_1/p) + a_{-1} \cos(2\pi s_{-1}/p) \\
&= \mathrm{Re}\{a_0 e^{i2\pi s_0/p} + a_1 e^{i2\pi s_1/p} + a_{-1} e^{i2\pi s_{-1}/p}\} \\
&= \mathrm{Re}\left\{a_0 e^{i2\pi s_0/p}\left(1 + \frac{a_1}{a_0} e^{i2\pi(s_1-s_0)/p} + \frac{a_{-1}}{a_0} e^{i2\pi(s_{-1}-s_0)/p}\right)\right\} \\
&= \mathrm{Re}\left\{a_0 e^{i2\pi s_0/p}\left(1 + \frac{a_1}{a_0} e^{i2\pi(s_1-s_0)/p} + \frac{a_{-1}}{a_0} e^{i2\pi(s_{-1}-s_0)/p}\right)\right\} \\
&= \mathrm{Re}\left\{a_0 e^{i2\pi s_0/p}\left(1 + \frac{a_1}{a_0} e^{i2\pi(\varphi_0+\varphi_b+\pi)t/p} + \frac{a_{-1}}{a_0} e^{-i2\pi(\varphi_0+\varphi_b-\pi)t/p}\right)\right\}.
\end{aligned}$$

Note that a separation is made between the rapidly varying wobble signal. (outside round brackets) and the slowly varying beat (inside round brackets).

The additional assumption is now made that the cross-talks from the left and right tracks are equal, i.e., $a_{-1}=a_1$. The beat signal can then be written as:

$$\begin{aligned}
&1 + \frac{a_1}{a_0} e^{i2\pi(\varphi_0+\varphi_b+\pi)t/p} + \frac{a_{-1}}{a_0} e^{-i2\pi(\varphi_0+\varphi_b-\pi)t/p} \\
&= 1 + \frac{a_1}{a_0} e^{i2\pi\pi t/p}(e^{i2\pi(\varphi_0+\varphi_b)t/p} + e^{-i2\pi(\varphi_0+\varphi_b)t/p}) \\
&= 1 + 2\frac{a_1}{a_0}\cos\left[(\omega_0+\omega_b)\frac{2\pi t}{p}\right]e^{i2\pi t/p} \\
&= 1 + 2\frac{a_1}{a_0}\cos\left[(\omega_0+\omega_b)\frac{2\pi t}{p}\right]\cos\left(\pi\frac{2\pi t}{p}\right) + i2\frac{a_1}{a_0}\cos\left[(\omega_0+\omega_b)\frac{2\pi t}{p}\right]\sin\left(\pi\frac{2\pi t}{p}\right) \\
&= \sqrt{1 + 4\frac{a_1}{a_0}\cos\left[(\varphi_0+\varphi_b)\frac{2\pi t}{p}\right]\cos\left(\pi\frac{2\pi t}{p}\right) + 4\left(\frac{a_1}{a_0}\right)^2\cos^2\left[(\varphi_0+\varphi_b)\frac{2\pi t}{p}\right]} \ *
\end{aligned}$$

$$\exp\left[i\arctan\left(\frac{2\frac{a_1}{a_0}\cos\left[(\varphi_0+\varphi_b)\frac{2\pi t}{p}\right]\sin\left(\pi\frac{2\pi t}{p}\right)}{1+2\frac{a_1}{a_0}\cos\left[(\varphi_0+\varphi_b)\frac{2\pi t}{p}\right]\cos\left(\pi\frac{2\pi t}{p}\right)}\right)\right]$$

The beat gives rise to both amplitude (the square-root factor) and phase modulation (the exponential factor). One also easily sees from these expressions that the period of one beat equals $p/2\pi t$ periods. In DVD+RW, for example, p=4265.6 nm and t=740 nm, so it takes 0.917 revolutions to complete one beat period.

The maximum and minimum values for the amplitude of the beat are reached for:

$$\sin\left[(\varphi_0+\varphi_b)\frac{2\pi t}{p}\right]=0 \Leftrightarrow \cos\left[(\varphi_0+\varphi_b)\frac{2\pi t}{p}\right]=\pm 1$$

and also for $$\cos\left[(\varphi_0+\varphi_b)\frac{2\pi t}{p}\right]=-\frac{\cos\left(\pi\frac{2\pi t}{p}\right)}{2a_0/a_1}$$

provided that $$\left|\cos\left(\pi\frac{2\pi t}{p}\right)\right|<2\frac{a_1}{a_0}.$$

It then follows that the maximum of the beat amplitude is given by:

$$\sqrt{1+4\frac{a_1}{a_0}\left|\cos\left(\pi\frac{2\pi t}{p}\right)\right|+4\left(\frac{a_1}{a_0}\right)^2},$$

and the minimum by either of the following two expressions:

$$\sqrt{1-4\frac{a_1}{a_0}\left|\cos\left(\pi 2\pi\frac{t}{p}\right)\right|+4\left(\frac{a_1}{a_0}\right)^2}, \text{ if } \left|\cos\left(\pi 2\pi\frac{t}{p}\right)\right|>2\frac{a_1}{a_0},$$

$$\sqrt{1-\cos^2\left(\pi 2\pi\frac{t}{p}\right)}, \text{ if } \left|\cos\left(\pi 2\pi\frac{t}{p}\right)\right|<2\frac{a_1}{a_0}.$$

From the above expressions, it is clear that the wobble beat is smallest when $|\cos(\pi 2\pi t/p)|$ is minimum, i.e., when $2\pi t/p=n+\frac{1}{2}$, where n is an integer.

Figure 3:
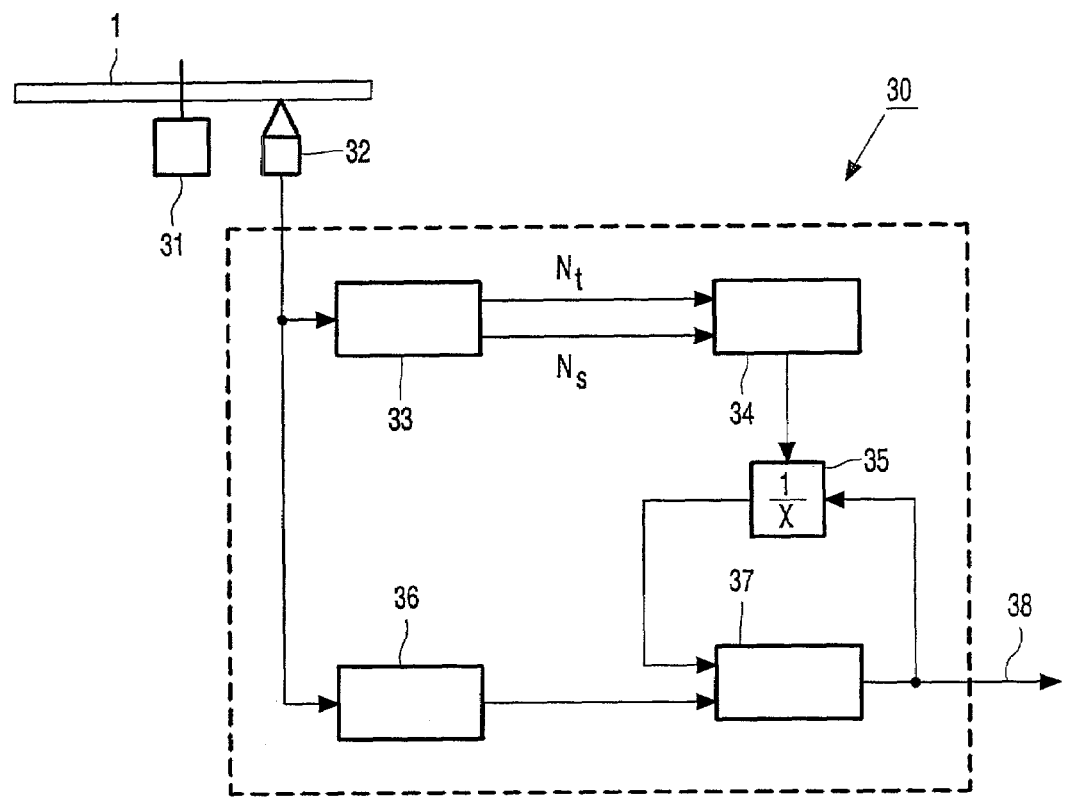
FIG. 3 shows a device for generating a bit clock.

FIG. 3 shows a device for generating a bit clock in accordance with the invention on the basis of the servo pattern of the record carrier 1, which is rotated by means of a motor 31. The motor 31 may rotate at a fixed speed, or the rotational speed may be controlled on the basis of the servo pattern. The track is scanned in the conventional manner by a read head 32 via a beam of electromagnetic radiation.

During reading, the servo pattern is scanned and a servo-signal is generated for controlling the position of the read head by servo-signal generator (not shown). In the device, disc and winding information may be regained from the servo-signal by the demodulator 33, for example, by demodulating a modulation of the wobble signal. The modulation may comprise addresses, or some indication of the winding. The winding information comprises, for example, a winding number $N_t$ of the relevant winding and, possibly, also a number $N_s$ of the relevant segment, these numbers being passed on to a computing unit 34. Secondly, synchronizing elements, for example, the pulses in the wobble signal, are detected from the servo-signal by a pulse detector 36. These detected pulses are coupled to a phase-locked loop (PLL) circuit 37 in which they are compared with a fraction of the bit clock 38 at the output of the PLL 37. This fraction is constituted by a divider 35 which divides the bit clock 38 by an adjustable dividend X. The dividend X may be a fixed value, or may be computed by the computing unit 34 from the position data (winding number $N_t$ and possible segment number $N_s$) and the track pitch which is known, for example, from a standard or which is present in the disc information on the record carrier. The dividend X can be computed once per winding and adjusted in the divider 35. In another embodiment, the dividend X may be predetermined or calculated less frequently or more frequently, for example, per segment or zone. The more frequently the dividend is adjusted, the more accurate the bit clock has the frequency associated with the radial position and, hence, the more accurately the bit length is constant. During continuous scanning of a zoned disc, it is desirable to render the steps in the change of the bit clock as small as possible. The dividend X may also be computed in advance for a desired position on the basis of a desired address, for example, when performing a jump instruction. In that case, the computing unit of a system control unit will acquire the information about the winding number and possible segment number. It is then an advantage that, when the jump is being performed, the bit clock can already be set to the new value which it should have upon arrival at the desired radial position.

Figure 4:
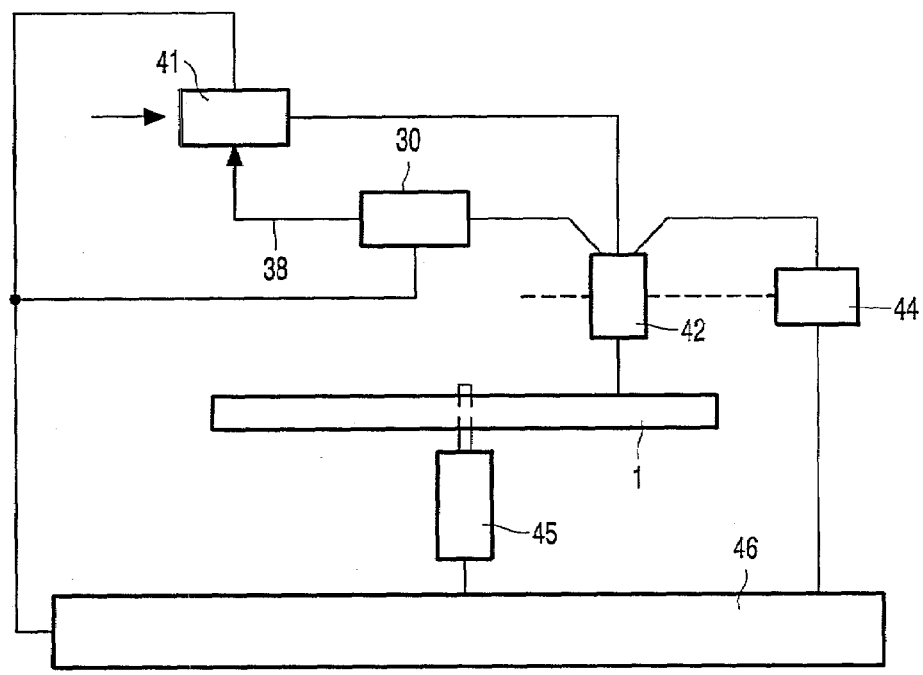
FIG. 4 shows a device for writing information blocks.

FIG. 4 shows a device for writing information blocks on a disc-shaped record carrier of a type which is rewritable in, for example, a magneto-optical or optical manner (via phase change) by means of a beam of electromagnetic radiation. The record carrier is identical to the record carrier shown in FIGS. 1a–1d. During the writing operation, marks representing the information are formed on the record carrier. The device is provided with drive means 45 for rotating the record carrier 1, and a write head 42 for scanning the track. The device is further provided with a system control unit 46 for receiving commands from a controlling computer system or from a user, and for controlling the device. To this end, the system control unit comprises, for example, a microprocessor, a program memory and control gates for performing the procedures described below, and for controlling said elements. The system control unit 46 may also be implemented as a state machine in logic circuits. The write head 42 is positioned in the radial direction on the track by positioning means 44, with position information from the track being detected. In accordance with known tracking and focusing methods, the write head scans the track, with, for example, a modulation being present in the tracking signal due to a wobble in a servo-pattern. The tracking signal is demodulated and the position information coded therein is regained in the positioning means 44 and passed on to the system control unit 46. The radial position of the write head can be verified by means of the regained position information. The information presented to the input of the writing means 41 is distributed, if necessary, into information blocks and converted into a write signal for the write head 42. The writing means 41 comprises, for example, an error coder and a channel coder. According to the invention, the writing device is provided with clock means 30 for generating the bit clock as described above with reference to FIG. 3, this bit clock being coupled to the writing means 41. The system control unit 46 controls the positioning means 44, the writing means 41 and the drive means 45, and is equipped for computing the winding numbers and angular position within the winding on the basis of the address of an information block. The system control unit 46 performs this computation in full bit lengths (and possibly simple rational fractions) without rounding errors being produced.

Figure 5:
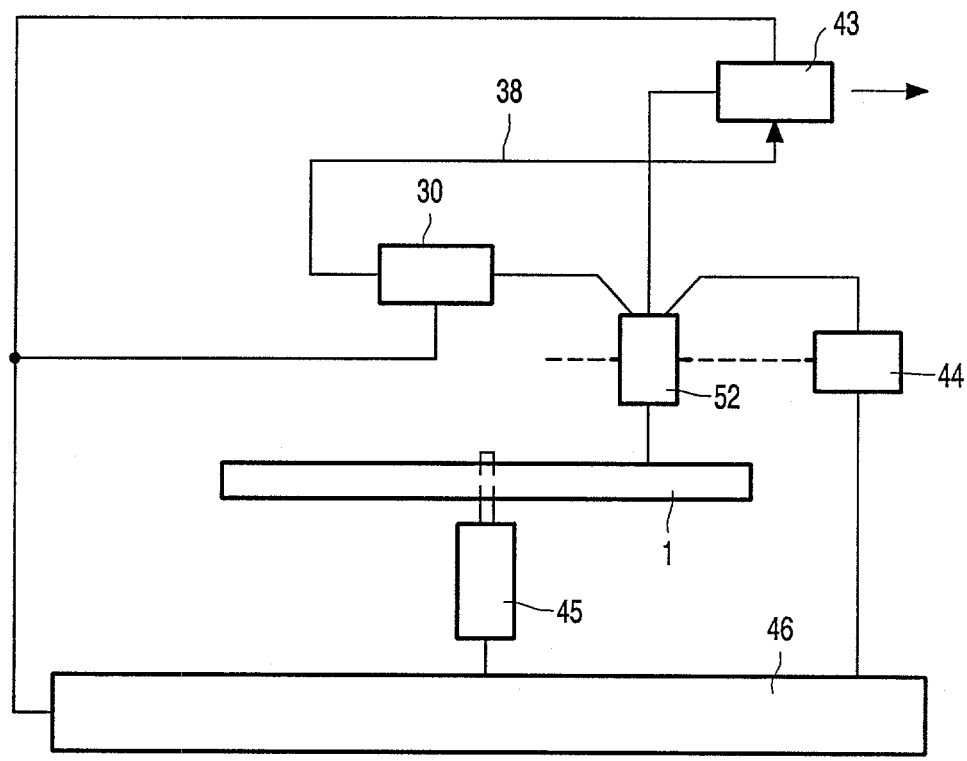
FIG. 5 shows a device for reading information blocks.

FIG. 5 shows a reading device, according to the invention, for reading information blocks. The reading device is provided with drive means 45 for rotating the disc-shaped record carrier 1, and a read head 52 for scanning the track on the record carrier. The read head 52 is positioned in the radial direction on the track by positioning means 44 on the basis of signals derived from marks of the record carrier. In accordance with the conventional Differential Phase Detection or Differential Time Detection system (DPD or DTD), for example, the reflected radiation can be received on a detector (not shown), this detector being subdivided into 4 sub-detectors. By determining phase or time differences between the signals of the sub-detectors, the position of the scanning spot with respect to the series of marks recorded in the track can be determined. During reading, the signal of the read head 52 is converted into the information in the reading means 43, for example, comprising a channel decoder and an error corrector. According to the invention, the device is provided with clock means 30 for generating the bit clock as described with reference to FIG. 3. The device is further provided with a system control unit 46 for controlling the device, this system control unit having functions corresponding to those of the system control unit of the writing device. The bit clock is coupled to the reading means 43, and is generated independently of the marks in the track. This is an advantage when an information block subsequent to a non-written area is written, because the bit clock prior to the information block has then already been set to the correct value. In reading devices of the conventional type, the bit clock is regained from the read signal, for example, via a PLL which then locks in on the read signal. In an embodiment of the reading device according to the invention, the clock means is adapted to additionally lock in on the marks. The frequency of the bit clock is then controlled both by the position, as in FIG. 3, and by a difference between the bit clock and the read signal of the marks. The position control has the advantage that the additional lock-in range of the bit clock can be limited to a great extent, because the desired frequency has substantially been computed and set. A correction of the phase and, if necessary, a small correction of the frequency are then performed by the additional lock-in on the basis of the marks. The additional lock-in is realized by controlling the clock means 30 only with the computed block and/or possibly with pulses of synchronizing elements during a jump, or when there are non-written areas. It is alternatively possible to start from synchronizing pulses derived from the drive means 45, such as tacho-pulses or control pulses from a synchronous motor. When the read head 52 is positioned on a written area and marks can be read, an extra control signal is generated and applied to the control input of the clock means. This extra control signal is generated, for example, by comparing the bit clock with the read signal in a phase comparator, and, based on the phase difference, the PLL is readjusted in the clock means 30. This provides the advantage that the bit clock is substantially determined by the exactly computed value based on the radial position and on the track pitch information, the winding number and the rotational speed, because the lock-in range can thereby be limited to a very large extent so that the bit clock is less sensitive to disturbances caused by, for example, dirt on the surface of the record carrier.

Figure 6:
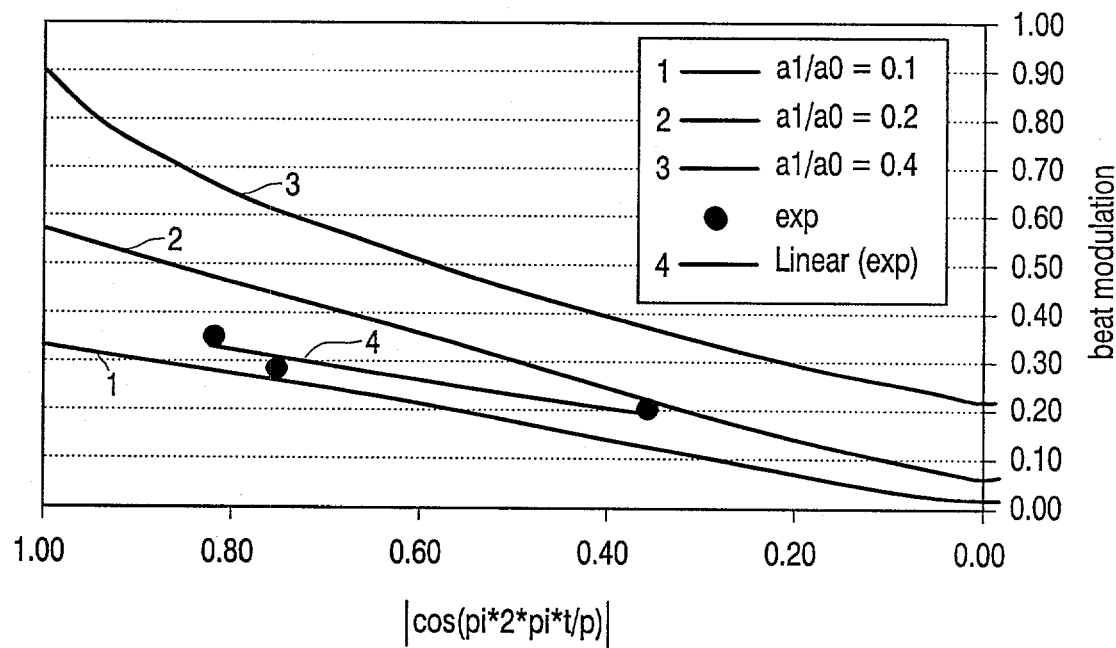
FIG. 6 shows calculated beat modulation.

FIG. 6 shows the calculated beat modulation. A number of numerical examples is given, including the results of an experiment. The beat modulation is defined as the difference between the maximum and minimum wobble beat amplitude, divided by the maximum beat amplitude. The table below shows relevant numbers for existing formats and for a format (DVR-RW) according to the invention. Note that $2\pi t/p$ is smaller than 0.2 in most known systems, except DVD+RW where $2\pi t/p=1.09$, and the new proposed format of DVR-RW according to the invention (last column) where $2\pi t/p=0.38$. The range of $0.30<2\pi t/p<0.70$ gives a significant improvement over all existing formats.

|  | CD-RW | DVD + RW | DVR-RW |
| --- | --- | --- | --- |
| channel bit length (nm) | 277.7 | 133.3 | 77.0 |
| channel bit rate (MHz) | 4.3 | 26.2 | 66.0 |
| velocity (m/s) | 1.20 | 3.49 | 5.08 |
| channel bits per wobble | 196 | 32 | 69 |
| wobble length (um) | 54.422 | 4.266 | 5.313 |
| wobble frequency (kHz) | 22.05 | 817.38 | 956.52 |
| track pitch (nm) | 1600 | 740 | 320 |
| 2*pi*(track pitch)/(wobble period) | 0.18 | 1.09 | 0.38 |

The situation described here has smallest amplitude variation of the beat factor. This situation corresponds, however, with the highest phase variation of the beat factor. The advantage thus depends on the relative importance of phase and amplitude variations.

Although the invention has been explained by embodiments using a wobble modulation, any other suitable parameter of the track may be modulated, e.g., the track width. Also, for the record carrier, an optical disc has been described, but other media, such as, a magnetic disc or tape, may be used. It is noted that in this document, the word 'comprising' does not exclude the presence of other elements or steps than those listed, and the word 'a' or 'an' preceding an element does not exclude the presence of a plurality of such elements, that any reference signs do not limit the scope of the claims, that the invention may be implemented by means of both hardware and software, and that several 'means' may be represented by the same item of hardware. Further, the scope of the invention is not limited to the embodiments, and the invention lies in each and every novel feature or combination of features described above.

The invention claimed is:

1. A record carrier comprising a servo track indicating an information track intended for recording information blocks represented by marks having lengths expressed in channel bits, said servo track having a wobble, said wobble being a periodic variation of a physical parameter of the servo track, and the servo track constituting a concentric or spiral pattern of substantially parallel tracks at a track pitch t, wherein a track pitch t of the servo track and a length of a wobble period p are related so that $2\pi t/p \approx n+\frac{1}{2}$ where n is an integer, wherein the length of the wobble period p corresponds to a whole number m times the length of a channel bit written on said record carrier, and wherein the number m of channel bits in a wobble period is 69.

2. The record carrier as claimed in claim 1, wherein the relation of the length of the wobble period and track pitch is $0.30 < 2\pi t/p - n < 0.70$.

3. The record carrier as claimed in claim 1, wherein the relation of the length of the wobble period and track pitch is $0.30 < 2\pi t/p < 0.70$.

4. A method of manufacturing a record carrier as claimed in claim 1, in which the record carrier is provided with a servo track indicating an information track intended for recording information blocks represented by marks having lengths expressed in channel bits, said servo track being provided with a periodic variation of a physical parameter, wherein a track pitch t of the servo track and a wobble period p, p being the number of channel bits per wobble times a length of a channel bit, are chosen in such a way that $2\pi t/p \approx n+\frac{1}{2}$, where n is an integer, and wherein the length of the wobble period p corresponds to a whole number m times the length of a channel bit.

5. A recording and/or playback device comprising means for writing and/or reading information blocks represented by marks having lengths expressed in channel bits in an information track on a servo track of a record carrier, said record carrier comprising a servo track indicating an information track intended for recording information blocks represented by marks having lengths expressed in channel bits, said servo track having a wobble, said wobble being a periodic variation of a physical parameter of the servo track, and the servo track constituting a concentric or spiral pattern of substantially parallel tracks at a track pitch t, wherein a track pitch t of the servo track and a length of a wobble period p are related so that $2\pi t/p \approx n+\frac{1}{2}$ where n is an integer, said recording and/or playback device comprising means for scanning the servo track and for retrieving the record carrier information, wherein the recording and/or playback device further comprises means for generating a wobble signal from said record carrier, and wherein the length of the wobble period p corresponds to a whole number m times the length of the channel bit, and wherein the number m of channel bits in a wobble period is 69.

* * * * *